(12) United States Patent
Stockdill

(10) Patent No.: US 9,429,390 B2
(45) Date of Patent: Aug. 30, 2016

(54) TELESCOPIC SIGHTS FOR FIREARMS, AND RELATED METHODS

(71) Applicant: Lightforce USA, Inc., Orofino, ID (US)

(72) Inventor: Kevin Stockdill, Orofino, ID (US)

(73) Assignee: Lightforce USA, Inc., Orofino, ID (US)

( * ) Notice: Subject to any disclaimer, the term of this patent is extended or adjusted under 35 U.S.C. 154(b) by 178 days.

(21) Appl. No.: 14/073,300

(22) Filed: Nov. 6, 2013

(65) Prior Publication Data

US 2015/0124243 A1   May 7, 2015

(51) Int. Cl.
*F41G 1/38* (2006.01)
*G02B 23/16* (2006.01)
*G01C 3/04* (2006.01)

(52) U.S. Cl.
CPC . *F41G 1/38* (2013.01); *G01C 3/04* (2013.01); *G02B 23/16* (2013.01)

(58) Field of Classification Search
CPC ............ G01C 3/12; G01C 3/14; G01C 3/02; G01C 3/04; G01C 3/24; G01C 3/20; G01C 5/00; G03B 13/20; G03B 13/02; G03B 13/06; G02B 23/14; G02B 23/00; G02B 7/04; F41G 3/06; F41G 1/38; F41G 1/473
USPC ........ 356/16, 8, 9, 17, 18, 11; 396/141, 142, 396/140, 139, 152, 281, 353; 359/813, 823, 359/401, 425, 424; 42/122, 125; 33/276
See application file for complete search history.

(56) References Cited

U.S. PATENT DOCUMENTS

| | | | |
|---|---|---|---|
| 1,948,588 A | 2/1934 | Martin | |
| 2,858,732 A | 11/1958 | Kollmorgen et al. | |
| 2,997,916 A | 8/1961 | Friedman et al. | |
| 5,280,332 A * | 1/1994 | Tocher et al. | 356/3.15 |
| 5,973,315 A * | 10/1999 | Saldana | F41G 3/06 250/214 VT |
| 6,005,711 A | 12/1999 | Mai et al. | |
| 6,721,095 B2 * | 4/2004 | Huber | G02B 27/34 359/425 |

(Continued)

FOREIGN PATENT DOCUMENTS

DE   29720737 U1   2/1998
WO   9927408         6/1999

OTHER PUBLICATIONS

Leupold Consumer Catalog 2015 (recovered from web site www.leupold.com and the models VX-2, FX, MARK, D-evo and Sa.b.r therein).*

(Continued)

*Primary Examiner* — Tarifur Chowdhury
*Assistant Examiner* — Mohamed K Amara
(74) *Attorney, Agent, or Firm* — Wood Herron & Evans LLP

(57) ABSTRACT

A telescopic sight (10) for a firearm includes a main housing (12), an objective lens assembly (22) for creating an image of a distant object, an ocular lens assembly (30) presenting the image to a viewer, and an optical element assembly (40) between the objective lens assembly (22) and the ocular lens assembly (30). The optical element assembly (40) includes a reticle piece (46) containing a reticle viewable by a user when the user views the image presented by the ocular lens assembly (30). A first adjuster (70, 74) is operatively coupled with the objective lens assembly (22) for removing parallax between the image and the reticle. A second adjuster (72, 76) is operatively coupled with the optical element assembly (40) for removing parallax between the image and the reticle.

21 Claims, 3 Drawing Sheets

(56) References Cited

U.S. PATENT DOCUMENTS

| | | | |
|---|---|---|---|
| 8,166,697 B1 | 5/2012 | Sueskind | |
| 8,286,383 B2 | 10/2012 | Matthews | |
| 9,104,096 B2* | 8/2015 | Koike | G03B 35/10 |
| 2002/0089752 A1* | 7/2002 | Morgan, III | G02B 23/14 |
| | | | 359/600 |
| 2009/0266892 A1* | 10/2009 | Windauer et al. | 235/404 |
| 2011/0037964 A1* | 2/2011 | Imamura | 356/3.13 |
| 2012/0097741 A1* | 4/2012 | Karcher | 235/404 |

OTHER PUBLICATIONS

Espacenet machine translation of Schmidt and Bender (German document DE29720737).*

Leupold Consumer Catalog 2012 (recovered from web site www.leupold.com).*

European Patent Office, International Search Report & Written Opinion issued in corresponding application No. PCT/US2014/063997, mailed Feb. 2, 2015, 10 pp.

* cited by examiner

TELESCOPIC SIGHTS FOR FIREARMS, AND RELATED METHODS

FIELD OF THE INVENTION

The present invention generally relates to sight devices, such as optical sights, for firearms. More particularly, the invention relates to parallax adjustable telescopic sights.

BACKGROUND

Sight devices are commonly used with firearms to provide a shooter with an aiming point. Several types of sight devices are available. For example, "iron" sights typically include a first sight piece positioned near the muzzle end of a firearm and a second sight piece positioned nearer to the breach end. The first and second sight pieces are positioned appropriately with respect to one another to align the firearm with an object.

Optical sights are another type of sight device and include optical components, such as lenses, and an indication of an aiming point. Typically, this indication of an aiming point is in the form of a reticle, which can have many configurations, such as dots, crosshairs, and others. Telescopic sights are a type of optical sight and include an optical system that magnifies the image viewed through the telescopic sight.

For some telescopic sights, the components of the optical system are essentially fixed with respect to each other and provide little or no adjustment. For other telescopic sights, some components of the optical system may be moved to make adjustments in the image viewed through the telescopic sight. Particularly, the position of one or more lenses may be changed to adjust the amount of magnification of the viewed image. The positional relationship between the components of the optical system is very sensitive to even fine adjustments, however, and making adjustments, such as to change the magnification or to focus on objects at various distances, can introduce parallax into the optical system.

Parallax is evident when the point of aim viewed through the telescopic sight changes as a shooter moves his eye laterally or vertically with respect to the telescopic sight. Where a telescopic sight includes a reticle as the indication of the aiming point, such an optical component is known as a reticle piece. In the absence of parallax, the point of aim indicated by the reticle does not move when the shooter moves his eye. Parallax is caused by a very slight misalignment of components in the telescopic sight. Particularly, parallax is caused when an image of the object is not focused in the same focal plane as a component that carries the indication of the aiming point.

Many telescopic sights have therefore been provided with an adjustment feature for removing parallax. In particular, such optical sights include either a front (adjustable objective) or side mounted parallax adjuster, and the parallax adjuster is used to cause a change in the alignment of the components of the optical system to remove parallax and bring the image of an object into focus in the same plane as the reticle piece.

Some parallax adjusters have included marks that attempt to identify an adjustment position to eliminate parallax for a particular distance to a target object. For example, an adjustment dial could have marks for 50 yards, 75 yards, 100 yards, 150 yards, and so on. If the shooter knows a distance to an object, say 100 yards, the shooter would operate the parallax adjuster to the position associated with the 100 yard mark to remove the parallax, at least in theory. The longest adjustment setting, usually representing a distance beyond the effective shooting range of the rifle is typically designated as "infinity" ($\infty$).

Such marks have proven to be less than ideal for reliably and accurately removing parallax, however. Particularly, it is believed that environmental conditions, especially temperature, can influence a telescopic sight in a manner that makes such marks only approximate guides, at best. For example, operating a parallax adjuster to the same adjustment position might have different effects depending on whether the environmental conditions of the telescopic sight are hotter or colder. In other words, an adjustment position that corresponds with no parallax at a given distance at a first temperature might not remove parallax at a second temperature. Experimentation has shown that a change in temperature as little as 2° F. can significantly affect the parallax setting. It is believed that, in high magnification precision optics, thermal expansion/contraction of the scope body relative to the factory temperature is enough to affect the axial spacing of the optical elements to an appreciable degree. Whether in hunting, military or tactical settings, it may be expected that the temperatures at which a rifle scope may used to span a range of 100° F. or more.

In addition to helping a shooter identify an adjustment position for removing parallax, such marks could also be helpful for shooters attempting to determine the distance to an object. For example, if a parallax adjuster were used to remove parallax, the corresponding adjustment position, as indicated by a mark, could identify the distance to the object. However, if the marks do not accurately reflect the actual distance to an object, this approach is unlikely to provide useful information. Moreover, because these indictors cannot be user-corrected for temperature or other variations, the markings tend to be either unlabeled (and, therefore, representing arbitrary or unknown increments) or labeled in very coarse and imprecise increments of 100 yards (or meters).

Scopes with higher magnification are generally intended to be used for aiming at longer distances. Because the range of parallax adjustment is limited, the adjustment mechanism usually does not allow for adjustment for short ranges, such as less than 100 or 50 yards (or meters).

There is a need, therefore, for telescopic sights that address one or more of the challenges discussed above.

SUMMARY OF THE INVENTION

The present invention overcomes the foregoing problems and other shortcomings and drawbacks of known telescopic sights. While the present invention will be described in connection with certain embodiments, it will be understood that the present invention is not limited to these embodiments. To the contrary, this invention includes all alternatives, modifications, and equivalents as may be included within the spirit and scope of the present invention.

According to one embodiment of the present invention, a telescopic sight for a firearm includes a main housing having a length extending along an axis between a first end and a second end. The telescopic sight also includes an objective lens assembly positioned within the main housing proximate the first end thereof and configured to create an image of a distant object, and an ocular lens assembly positioned within the main housing proximate the second end thereof and configured to present the image to a viewer. The telescopic sight also includes an optical element assembly positioned within the main housing and between the objective lens assembly and the ocular lens assembly, the optical element assembly including a reticle piece containing a reticle viewable by a user when the user views the image presented by the ocular lens assembly. The telescopic sight also includes a first adjuster positioned external of the main housing and operatively coupled with the objective lens assembly such that movement of the first adjuster causes axial movement of a component of the objective lens assembly for removing parallax between the image and the reticle, and a second adjuster positioned external of the main housing and operatively coupled with the optical element assembly such that movement of the second adjuster causes axial movement of a component of the optical element assembly for removing parallax between the image and the reticle.

According to another embodiment of the invention, a method is provided for adjusting a telescopic sight, as discussed above. The method aiming the telescopic sight at a first distant object at a location farther away than an intended shooting range, and moving one of the first adjuster and the second adjuster to remove the parallax between an image of the first distant object and the reticle. The method further includes noting an index point for the other of the first adjuster and the second adjuster. The method further includes aiming the telescopic sight at a second distant object at a known distance within the intended shooting range, and moving the other of the first adjuster and the second adjuster to remove the parallax between an image of the second distant object and the reticle. The method further includes noting a first range point for the other of the first adjuster and the second adjuster corresponding with the known distance to the second distant object.

According to another embodiment of the invention, a method is provided for determining a distance to an object using a telescopic sight, as discussed above. The method includes aiming the telescopic sight at the object, and moving one of the first adjuster and the second adjuster to remove the parallax between an image of the object and the reticle. The method further includes determining the distance to the object based on a position of the one of the first adjuster and the second adjuster.

According to another embodiment of the invention, a method is provided for adjusting a telescopic sight, as discussed above, for aiming at nearby object. The method includes aiming the telescopic sight at a first nearby object within an intended shooting range, and moving one of the first adjuster and the second adjuster to remove the parallax between an image of the first nearby object and the reticle. The method further includes aiming the telescopic sight at a second nearby object within the intended shooting range, and moving the other of the first adjuster and the second adjuster to remove the parallax between an image of the second nearby object and the reticle.

By virtue of the foregoing, there are thus provided improvements relating to telescopic sights. These and other objects and advantages of the present invention shall be made apparent from the accompanying drawings and the description thereof.

BRIEF DESCRIPTION OF THE DRAWINGS

The accompanying drawing figures, which are incorporated in and constitute a part of this specification, illustrate embodiments of the invention and, together with a general description of the invention given above, and the detailed description of the embodiments given below, serve to explain the principles of the invention. Like parts are identified by like reference numerals throughout the various figures of the drawing, wherein.

DETAILED DESCRIPTION OF THE ILLUSTRATIVE EMBODIMENTS

Figure 1:
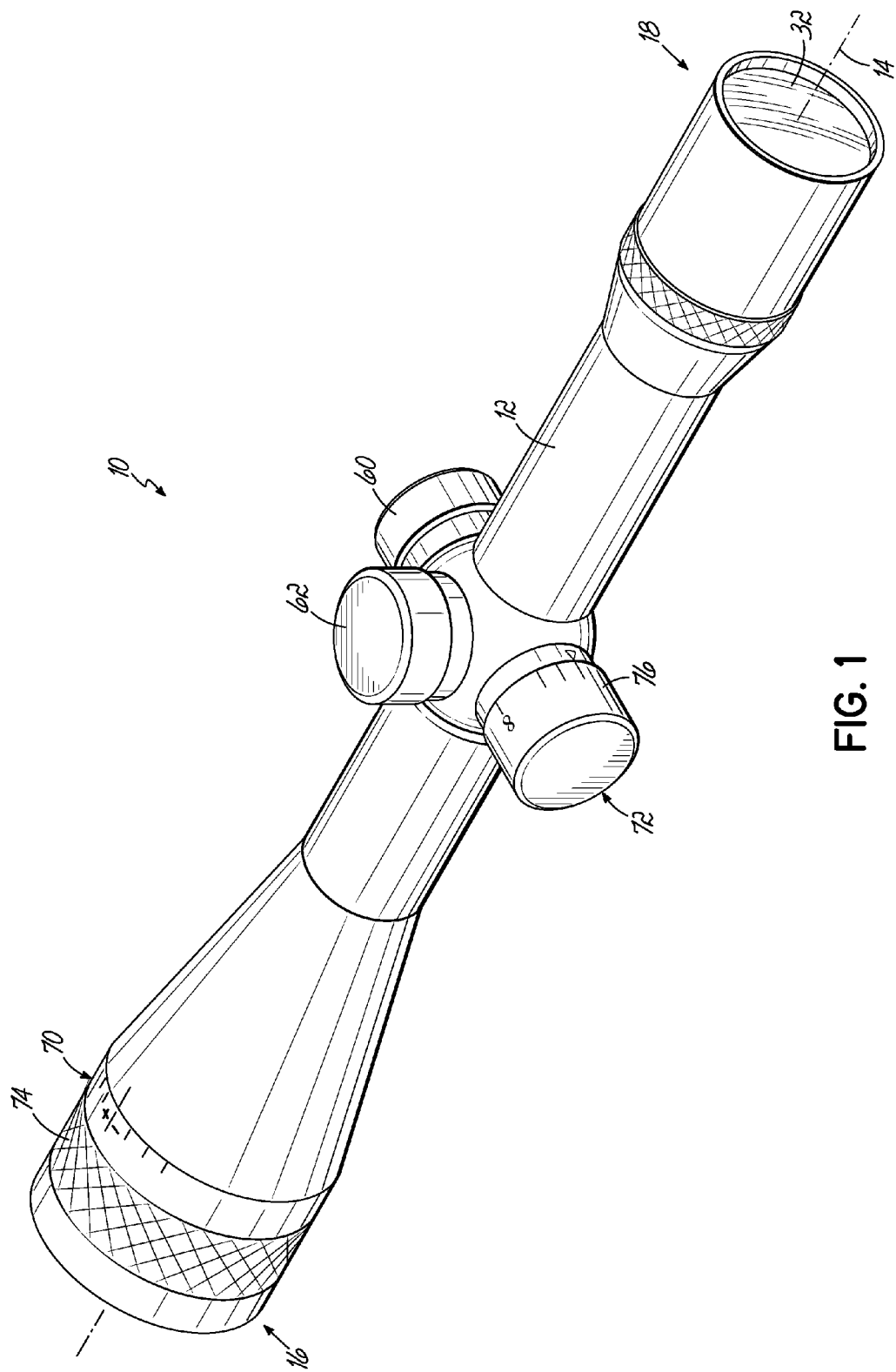
FIG. 1 is an isometric view showing a telescopic sight according to an embodiment of the invention.
Figure 2:
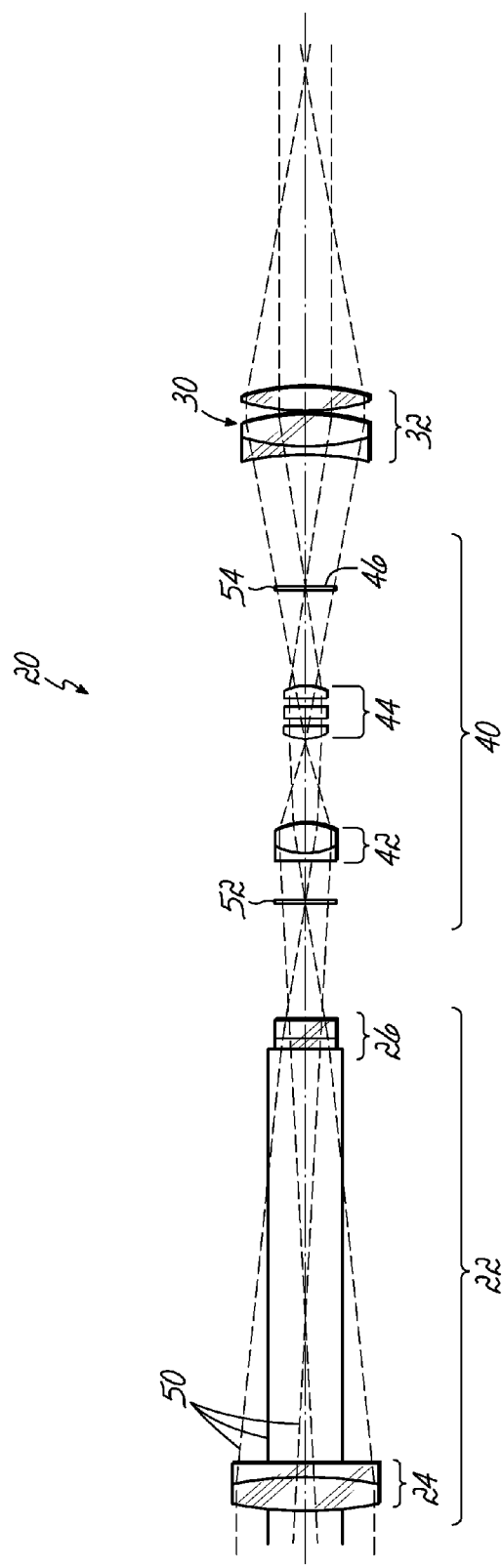
FIG. 2 is a ray-trace diagram showing the optical system of the telescopic sight of FIG. 1.
Figure 3:
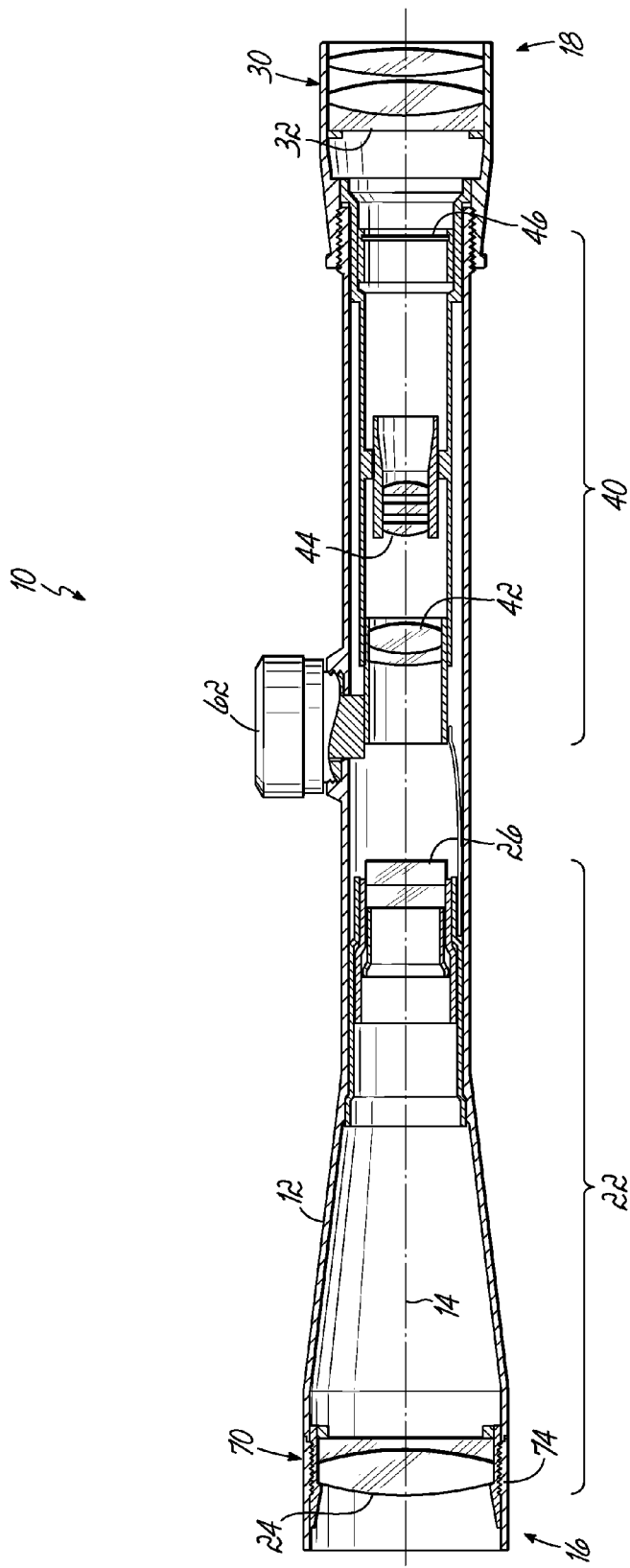
FIG. 3 is a cross sectional view of the telescopic sight of FIG. 1.

Referring to the figures, a telescopic sight or scope 10 is shown and generally includes a main housing 12 having a length extending along an axis 14 between a first (objective) end 16 and a second (eyepiece or ocular) end 18. The telescopic sight 10 is suitable for use with a firearm, such as a rifle, and includes an optical magnification system 20 that allows a shooter to observe distant objects. The optical system 20 includes three major assemblies.

First, the optical system 20 includes an objective lens assembly 22 proximate the first end 16 of the main housing 12. The objective lens assembly 22 is configured to create an image of a distant object, and in the embodiment shown includes a first objective lens element 24 and a second objective lens element 26 spaced axially rearward of the first objective lens element 24.

Second, the optical system 20 includes an ocular lens assembly 30 positioned within the main housing 12 proximate the second end 18. The ocular lens assembly 30 is configured to present the image of the distant object created by the objective lens assembly 22 to the shooter. In the embodiment shown, the ocular lens assembly 30 includes an ocular lens element 32.

Third, the optical system 20 includes an optical element assembly 40 positioned within the main housing 12 between the objective lens assembly 22 and the ocular lens assembly 30. The optical element assembly 40 is configured to manipulate the image created by the objective lens assembly 22 before presenting the image to the shooter through the ocular lens assembly 30. In the embodiment shown, the optical element assembly 40 includes a collector element 42, an erector element 44, and a reticle piece 46. The reticle piece 46 includes a reticle that is viewable by the shooter when the shooter views the image presented by the ocular lens assembly 30.

These components of the optical system 20 cooperate together as follows. Light beams 50 emanating from a distant object are directed into the objective lens assembly 22, which creates an image of the distant object focused at a first focal plane 52. The collector element 42 collects these light beams 50 and directs them toward the erector element 44. The erector element 44 causes the image to be flipped, magnified, and causes the light beams to be focused at a second focal plane 54. The reticle piece 46 is advantageously positioned at the same location as the second focal plane 54 such that the image formed there is at the same focal distance from the ocular lens assembly 30. Alternatively, the reticle piece 46 may be positioned at the same location (not shown) as the first focal plane 52. The shooter looks through the ocular lens assembly 30 to perceive the image of the distant object.

The telescopic sight 10 includes a windage adjuster 60 and an elevation adjuster 62 for adjusting the left-right and up-down positions, respectively, of the reticle viewed through the ocular lens assembly 30. As shown in FIG. 1, the windage adjuster 60 and elevation adjuster 62 are positioned external of the main housing 12.

In addition, the telescopic sight 10 includes a first parallax adjuster 70 and a second parallax adjuster 72. Controls for the parallax adjusters 70, 72 are both positioned external of the main housing 12, and are independently operable to remove parallax caused by adjustments of the optical system 20. In particular, the first parallax adjuster 70 is operatively coupled with the objective lens assembly 22 such that rotation of the first parallax adjuster 70, because of its threaded engagement, causes axial movement of one or more components of the objective lens assembly 22 for removing parallax between the image and the reticle. The first parallax adjuster 70 includes a rotatable member 74 that generally surrounds the main housing 12 proximate the first end 16 thereof. The rotatable member 74 is rotated around the axis 14 to cause axial movements of one or more components the objective lens assembly 22. By rotating the rotatable member 74, the shooter can cause adjustments in the optical system 20 to remove parallax. Particularly, the shooter will appreciate that parallax is removed when there is no movement of the reticle even when the shooter moves his eye relative to the telescopic sight. A lock device of well-known construction may be provided for securing a position of the rotatable member 74.

The second parallax adjuster 72 is operatively coupled with the optical element assembly 40 such that movement of the second parallax adjuster 72 causes axial movement of one or more components of the optical element assembly 40 for removing parallax between the image and the reticle. The second parallax adjuster 72 includes a rotatable knob 76 projecting outwardly from the main housing 12 generally between the first end 16 and the second end 18. As shown in FIG. 1, the rotatable knob 76 is positioned on the saddle generally opposite the windage adjuster 60. The rotatable knob 76 is rotated to cause axial movements of one or more components of the optical element assembly 40 using any of various well-known mechanisms. By rotating the knob 76, the shooter can cause adjustments in the optical system 20 to remove parallax. Particularly, the shooter will appreciate that parallax is removed when there is no movement of the reticle even when the shooter moves his eye relative to the telescopic sight, resulting from the target object and the reticle being in the same focal plane. A lock device may be provided for securing a position of the rotatable knob 76.

In some embodiments, the second objective lens element 26 may be considered a component of the optical element assembly 40. Thereby, movement of the second parallax adjuster 72 may in some cases cause axial movement of the second objective lens element 26, for removing parallax as discussed above.

Optionally, at least one of the first and second parallax adjusters 70, 72 can include scale marks for indicating the distance to a distant object when parallax is removed from the optical system 20. The scale marks indicia may be provided as a permanent part of the parallax adjusters 70, 72, or may be added by the shooter. The scale marks may include numbers, ticks, both, or other features that provide a useful visual indication of distance or distance increments.

Additionally, at least one of the first and second parallax adjusters 70, 72 can include temperature indication marks, indicating appropriate or factory preset adjustment calibration for given temperatures. For example, the indicia markings shown on the first parallax adjuster 70 in FIG. 1, could be a temperature indication scale indicating temperature settings in ° F. or ° C. A shooter would adjust the parallax adjuster according to the scale so that the operating temperature of the telescopic sight 10 is reflected in the adjustment position of the parallax adjuster. For example, when the telescopic sight 10 is at a temperature of 75° F., the parallax adjuster would be adjusted so that the 75° F. temperature mark 82 is in an appropriate position. Alternatively, a temperature indicating device (such as an electronic thermometer, not shown) could be incorporated into the device 10 to display the temperature reading internally (such as on the reticle piece) so that the temperature can be observed by a shooter looking through the ocular lens assembly 30 and/or to automatically adjust one of the parallax adjusters 70, 72 according to a preselected calibration setting for the detected temperature.

In some embodiments, either or both of the first and second parallax adjusters 70, 72 can include an electronic position sensor for detecting a position of the adjuster(s) 70, 72. A display can be operatively coupled with the electronic position sensor and configured to display a distance to a distant object based on the position detected by the electronic position sensor. For example, the display can be positioned inside the telescopic sight 10 so that it is observed by a shooter looking through the ocular lens assembly 30. Any suitable display can be used.

By having both a first parallax adjuster 70 and a second parallax adjuster 72, the telescopic sight 10 offers several advantages. Particularly, the dual parallax adjusters 70, 72 allow the adjustments to remove parallax, with one of the parallax adjusters 70, 72 being used to calibrate the other parallax adjuster 70, 72 for any temperature. Thereby, the marks on the parallax adjusters 70, 72 can be in appropriate locations for accurately displaying the distance to a distant object. When the marks accurately reflect the distance to a distant object, a shooter can look through the telescopic sight 10 and adjust the adjusters 70, 72 to remove parallax from the optical system 20, and then determine the distance to the distant object based on a position of the adjusters 70, 72. Because the marks can be calibrated, making them accurate, they can also be more precise, i.e., they can be in smaller increments and, therefore, more useful to the user. In addition, the dual parallax adjusters 70, 72 allow the telescopic sight 10 to be focused at nearby objects which would otherwise be too close to the telescopic sight 10 to be properly focused.

A method for adjusting or calibrating the telescopic sight 10 is now described. First, the telescopic sight 10 is aimed at a first distant object at a location farther away than an intended shooting range with either the first parallax adjuster 70 or the second parallax adjuster 72 set to the "infinity" setting. Then, the other of the parallax adjusters is used to remove the parallax between an image of the first distant object and the reticle. This will have "corrected" the scope for any difference in temperature between ambient temperature and the temperature at which the scope was originally calibrated at the factory. The position of either the first parallax adjuster 70 or the second parallax adjuster 72 when parallax is removed is noted as an index point (which is generally known as an infinity index point).

Then, the telescopic sight 10 is aimed at a second distant object at a known or unknown distance within the intended shooting range. The other of the parallax adjusters 70, 72 is used to remove the parallax between an image of the second distant object and the reticle. A first range point is then noted for the other of parallax adjusters 70, 72 that corresponds with the known distance to the second distant object. Noting an index point can include making a mark on a parallax adjuster 70, 72, noting a position of an adjuster 70, 72 in a log, or capturing the position of an adjuster 70, 72 using an electronic position detector. An electronic position detector may offer the advantage of much finer resolution and accuracy, thereby providing position information beyond the capability of merely making marks on a parallax adjuster. This process can be repeated to provide a series of range points, which indicate positions of the parallax adjusters 70, 72 for known distances to distant objects. Optionally, a locking device can be used to secure the position of either of the parallax adjusters 70, 72, as appropriate. Once the telescopic sight 10 is thus calibrated, the distance to a distant object can be accurately displayed when the parallax adjusters 70, 72 are used to remove parallax from the optical system 10 between the distant object and the reticle. It is expected that, typically, the side parallax adjuster (second adjuster 72) would be set to infinity, with the calibration being made by adjustment and locking in place of the objective adjuster (first adjuster 70). Once so calibrated, the side parallax adjuster (second adjuster 72) may be more easily used for field adjustment without the shooter moving his eye away from the eyepiece.

A telescopic sight 10 that has been calibrated, as discussed above, can be used according to a method for determining a distance to a target object. The method includes aiming the telescopic sight 10 at the object, and then using one of the parallax adjusters 70, 72 to remove the parallax between an image of the object and the reticle. Then, the shooter can determine the distance to the object based on the position of the adjuster 70, 72 that was used to remove parallax. For example, this can involve viewing a range mark on one of the first and second parallax adjusters 70, 72. This could also involve viewing a displayed value of the distance, as presented by a display device that is viewed by a shooter through the ocular lens assembly 30.

A telescopic sight 10 can also be adjusted according to a method for viewing objects at distances less than the expected minimum range. The method includes aiming the telescopic sight 10 at a first nearby object within an intended shooting range. Either of the parallax adjusters 70, 72 is used to remove parallax between an image of the first nearby object and the reticle. Then, the telescopic sight 10 is aimed at a second nearby object within the intended shooting range. The other of the parallax adjusters 70, 72 is then used to remove the parallax between an image of the second nearby object and the reticle. In effect, the use of dual parallax adjustments allows the calibrating adjustment to shift the other adjustment to operate in a "negative," i.e., less than expected minimum, range. This may be advantageous, for example, where the intended shooting range is less than about 100 yards, or where the first nearby object is located between about 10 yards and about 50 yards from the telescopic sight 10. Optionally, a locking device can be used to secure the position of either of the parallax adjusters 70, 72, as appropriate.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A telescopic sight for a firearm, comprising:
a main housing having a length extending along a lengthwise axis between a first end and a second end,
an objective lens assembly positioned within the main housing proximate the first end thereof and configured to create an image of a distant object,
an ocular lens assembly positioned within the main housing proximate the second end thereof and configured to present the image to a viewer,
an optical element assembly positioned within the main housing and between the objective lens assembly and the ocular lens assembly, the optical element assembly including a reticle piece containing a reticle viewable by a user when the user views the image presented by the ocular lens assembly,
a first adjuster positioned external of the main housing and operatively coupled with the objective lens assembly such that movement of the first adjuster causes axial movement along the lengthwise axis of a component of the objective lens assembly for removing parallax between the image and the reticle, and
a second adjuster positioned external of the main housing and operatively coupled with the optical element assembly such that movement of the second adjuster causes axial movement along the lengthwise axis of a component of the optical element assembly for removing parallax between the image and the reticle.

2. The telescopic sight of claim 1, wherein the first adjuster includes a rotatable member generally surrounding the main housing proximate the first end thereof, and the second adjuster includes a rotatable knob projecting outwardly from the main housing generally between the first end and the second end thereof.

3. The telescopic sight of claim 1, further comprising a lock device for securing a position of at least one of the first adjuster and the second adjuster.

4. The telescopic sight of claim 1, further comprising scale marks on at least one of the first adjuster and the second adjuster, the scale marks providing an indication of the distance between the objective lens and the distant object.

5. The telescopic sight of claim 1, further comprising an electronic position sensor for detecting a position of at least one of the first adjuster and the second adjuster.

6. The telescopic sight of claim 5, further comprising a display operatively coupled with the electronic position sensor and configured to display a distance between the objective lens and the distant object based on the position detected by the electronic position sensor.

7. The telescopic sight of claim 1, further comprising a temperature sensor configured for displaying a temperature of the telescopic sight.

8. A method of adjusting a telescopic sight having a main housing having a length extending along a lengthwise axis between a first end and a second end, an objective lens assembly positioned within the main housing proximate the first end thereof and configured to create an image of a distant object, an ocular lens assembly positioned within the main housing proximate the second end thereof and configured to present the image to a viewer, an optical element assembly positioned within the main housing and between the objective lens assembly and the ocular lens assembly, the optical element assembly including a reticle piece containing a reticle viewable by a user when the user views the image presented by the ocular lens assembly, a first adjuster positioned external of the main housing and operatively coupled with the objective lens assembly such that movement of the first adjuster causes axial movement along the lengthwise axis of a component of the objective lens assembly for removing parallax between the image and the reticle, and a second adjuster positioned external of the main housing and operatively coupled with the optical element assembly such that movement of the second adjuster causes axial movement along the lengthwise axis of a component of the optical element assembly for removing parallax between the image and the reticle, the method comprising:

aiming the telescopic sight at a first distant object at a location farther away than an intended shooting range, moving one of the first adjuster and the second adjuster to remove the parallax between an image of the first distant object and the reticle, noting an index point for the other of the first adjuster and the second adjuster, aiming the telescopic sight at a second distant object at a known distance within the intended shooting range, moving the other of the first adjuster and the second adjuster to remove the parallax between an image of the second distant object and the reticle, and noting a first range point for the other of the first adjuster and the second adjuster corresponding with the known distance to the second distant object.

9. The method of claim 8, further comprising aiming the telescopic sight at a third distant object at a known distance within the intended shooting range, moving the other of the first adjuster and the second adjuster to remove the parallax between the image of the third distant object and the reticle, and noting a second range point for the other of the first adjuster and the second adjuster corresponding with the known distance to the third distant object.

10. The method of claim 8, wherein the first adjuster includes a rotatable member generally surrounding the main housing proximate the first end thereof, and the second adjuster includes a rotatable knob projecting outwardly from the main housing generally between the first end and the second end thereof, and wherein moving one of the first adjuster and the second adjuster to remove the parallax between the image of the first distant object and the reticle includes rotating the rotatable member relative to the main housing, and wherein moving the other of the first adjuster and the second adjuster to remove the parallax between the image of the first distant object and the reticle includes rotating the knob.

11. The method of claim 8, further comprising after moving one of the first adjuster and the second adjuster to remove the parallax between the image of the first distant object and the reticle, securing the position of the one of the first adjuster and the second adjuster.

12. The method of claim 8, wherein noting an index point includes making an index mark on the other of the first adjuster and the second adjuster, and wherein noting a first range point includes making a first range mark on the other of the first adjuster and the second adjuster.

13. The method of claim 8, further comprising displaying a distance to the second distant object based on the position of the other of the first adjuster and the second adjuster after moving the other of the first adjuster and the second adjuster to remove the parallax between the image of the second distant object and the reticle.

14. A method of determining a distance to an object using a telescopic sight having a main housing having a length extending along a lengthwise axis between a first end and a second end, an objective lens assembly positioned within the main housing proximate the first end thereof and configured to create an image of a distant object, an ocular lens assembly positioned within the main housing proximate the second end thereof and configured to present the image to a viewer, an optical element assembly positioned within the main housing and between the objective lens assembly and the ocular lens assembly, the optical element assembly including a reticle piece containing a reticle viewable by a user when the user views the image presented by the ocular lens assembly, a first adjuster positioned external of the main housing and operatively coupled with the objective lens assembly such that movement of the first adjuster causes axial movement along the lengthwise axis of a component of the objective lens assembly for removing parallax between the image and the reticle, and a second adjuster positioned external of the main housing and operatively coupled with the optical element assembly such that movement of the second adjuster causes axial movement along the lengthwise axis of a component of the optical element assembly for removing parallax between the image and the reticle, the method comprising:

aiming the telescopic sight at the object, moving one of the first adjuster and the second adjuster to remove the parallax between an image of the object and the reticle, determining the distance to the object based on a position of the one of the first adjuster and the second adjuster.

15. The method of claim 14, wherein determining the distance includes viewing a range mark on the one of the first adjuster and the second adjuster, the range mark corresponding with a distance.

16. The method of claim 14, wherein determining the distance includes viewing a displayed value of the distance.

17. The method of claim 16, wherein the displayed value is viewed through the ocular lens assembly.

18. A method of adjusting a telescopic sight having a main housing having a length extending along a lengthwise axis between a first end and a second end, an objective lens assembly positioned within the main housing proximate the first end thereof and configured to create an image of a distant object, an ocular lens assembly positioned within the main housing proximate the second end thereof and configured to present the image to a viewer, an optical element assembly positioned within the main housing and between the objective lens assembly and the ocular lens assembly, the optical element assembly including a reticle piece containing a reticle viewable by a user when the user views the image presented by the ocular lens assembly, a first adjuster positioned external of the main housing and operatively coupled with the objective lens assembly such that movement of the first adjuster causes axial movement along the lengthwise axis of a component of the objective lens assembly for removing parallax between the image and the reticle, and a second adjuster positioned external of the main housing and operatively coupled with the optical element assembly such that movement of the second adjuster causes axial movement along the lengthwise axis of a component of the optical element assembly for removing parallax between the image and the reticle, the method comprising:

aiming the telescopic sight at a first nearby object within an intended shooting range, moving one of the first adjuster and the second adjuster to remove the parallax between an image of the first nearby object and the reticle, aiming the telescopic sight at a second nearby object within the intended shooting range, and moving the other of the first adjuster and the second adjuster to remove the parallax between an image of the second nearby object and the reticle.

19. The method of claim 18, further comprising after moving one of the first adjuster and the second adjuster to remove the parallax between the image of the first nearby object and the reticle, securing the position of the one of the first adjuster and the second adjuster.

20. The method of claim 18, wherein the intended shooting range is less than about 100 yards.

21. The method of claim 18, wherein the first nearby object is located between about 10 yards and about 50 yards from the telescopic sight.

\* \* \* \* \*